United States Patent [19]

Suzuki

[11] Patent Number: 5,534,710
[45] Date of Patent: Jul. 9, 1996

[54] RADIATION IMAGE STORAGE PANEL AND RADIATION IMAGE READING METHOD

[75] Inventor: Hideki Suzuki, Kanagawa, Japan

[73] Assignee: Fuji Photo Film Co., Ltd., Kanagawa, Japan

[21] Appl. No.: 413,904

[22] Filed: Mar. 30, 1995

[30] Foreign Application Priority Data

Apr. 15, 1994 [JP] Japan .................... 6-101998

[51] Int. Cl.⁶ .................... G21K 4/00; G03B 42/02
[52] U.S. Cl. .................... 250/588; 250/487.1
[58] Field of Search .................... 250/588, 581, 250/584, 484.4, 487.1

[56] References Cited

U.S. PATENT DOCUMENTS 4,849,630  7/1989  Fukai et al. .................... 250/588
5,237,177  8/1993  Kimura .................... 250/580

FOREIGN PATENT DOCUMENTS 5587970  7/1980  Japan .
1023248  1/1989  Japan .................... 250/588
4003140  1/1992  Japan .................... 250/588

*Primary Examiner*—Davis L. Willis
*Assistant Examiner*—Richard Honig
*Attorney, Agent, or Firm*—Sixbey, Friedman, Leedom & Ferguson

[57] ABSTRACT

A radiation image storage panel comprising a stimulable phosphor layer and an erasing light-diffusion preventive layer capable of allowing transmission of stimulated emission while preventing an erasing light from diffusing within the preventive layer along its plane is favorably employed in a radiation image reading system employing a double-side reading system in which a stimulating step and an erasing step are simultaneously performed in parallel on the same storage panel.

8 Claims, 6 Drawing Sheets

RADIATION IMAGE STORAGE PANEL AND
RADIATION IMAGE READING METHOD

FIELD OF THE INVENTION

The present invention relates to a radiation image storage panel utilizing a stimulable phosphor and a radiation image recording and reproducing method employing the radiation image storage panel. The invention is specifically directed to a radiation image recording and reproducing method which comprises the successive steps of detecting the emission produced by the stimulable phosphor of the radiation image storage panel on both sides of the storage panel and thereafter erasing a radiation image remaining in the storage panel.

BACKGROUND OF THE INVENTION

A radiation image recording and reproducing method utilizing a stimulable phosphor described, for instance, in U.S. Pat. No. 4,239,968, is now practically employed. In the method, a radiation image storage panel comprising a stimulable phosphor (i.e., stimulable phosphor sheet) is employed, and the method involves the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (i.e., stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to an object at a considerably smaller dose, as compared with a conventional radiography using a combination of a radiographic film and radiographic intensifying screen. Further, the radiation image recording and reproducing method using a stimulable phosphor is of great value especially when the method is employed for medical diagnosis.

The radiation image storage panel employed in the above-described method comprises a stimulable phosphor layer which optionally provided on a support. Further, a transparent layer of a polymer material is generally provided on the free surface (e.g., surface not facing the support) of the phosphor layer to keep the phosphor layer from chemical deterioration or physical shock.

The phosphor layer generally comprises a binder and a stimulable phosphor (in the form of particles) dispersed therein. The stimulable phosphor emits light (that is, gives stimulated emission) when it is exposed to radiation such as X-rays and then excited with an electromagnetic wave (i.e., stimulating rays). Accordingly, the radiation having passed through an object or radiated from an object is absorbed by the stimulable phosphor layer of the panel in proportion to the applied radiation dose, and a radiation image of the object is produced on the panel in the form of a radiation energy-stored image. The radiation energy-stored image can be released as stimulated emission by sequentially irradiating the storage panel with stimulating rays. The stimulated emission is then photoelectrically detected to give a series of electric signals, so as to reproduce a visible image from the electric signals.

In the radiation image recording and reproducing method, a radiation image storage panel having a vacuum-deposited or sintered stimulable phosphor layer also can be employed.

The radiation image recording and reproducing method is generally performed in a united radiation image recording and reading apparatus which comprises recording means (for applying a radiation having an image information to the radiation image storage panel to record the radiation image on the storage panel); reading means (for irradiating the stimulating rays to the storage panel having the radiation image to produce stimulated emission from the storage panel and photoelectrically reading the stimulated emission); erasing means (for applying an erasing light to the storage panel after the reading step is complete to remove a radiation image remaining in the storage panel); and transfer system (which is arranged between these means, for transferring the storage panel from one means to another means in predetermined order). Alternatively, the radiation image recording and reading apparatus may comprise two separated apparatuses, that is, a radiation image recording apparatus and a radiation image reading apparatus equipped with erasing means.

In any of the radiation image recording and reproducing systems, the radiation image storage panel is repeatedly employed after the remaining radiation image is erased.

In the radiation image recording and reproducing method, the radiation image recorded in the storage panel is generally read by applying the stimulating rays to one side of the storage panel and collecting light emitted by the phosphor particles by means of a light-collecting means from the same side (hereinafter referred to as "single-side reading system"). There is a case, however, that the light emitted by the phosphor particles should be collected on both sides of the storage panel. This is because the emitted light is desirable collected as much as possible. There also is a case that the radiation image recorded in the phosphor layer varies along the depth direction of the layer and such variation of the radiation image should be detected. An example of the system for reading the radiation image from both sides (hereinafter referred to as "double-side reading system") is illustrated in FIG. 1 of the attached drawings.

In FIG. 1, the radiation image storage panel 11 is transferred (or moved) by a combination of two sets of nip rolls 12a, 12b. The stimulating rays such as laser beam 13 is applied to the storage panel 11 on one side, and the light emitted by the phosphor particles advances upward and downward (in other words, toward both the upper and lower surfaces). The downward light 14a is collected by a light collector 15a (arranged on the lower side), converted into an electric signal in a photoelectric conversion device (e.g., photomultiplier) 16a, multiplied in a multiplier 17a, and then sent to a signal processor 18. On the other hand, the upward light 14b is directly, or after reflection on a mirror 19, collected by a light collector 15b (arranged on the upper side), converted into an electric signal in a photoelectric conversion device (e.g., photomultiplier) 16b, multiplied in a multiplier 17b, and then sent to the signal processor 18. In the signal processor 18, the electric signals sent from the multipliers 17a, 17b are processed in a predetermined manner such as addition processing or reduction processing depending upon characteristics of the desired radiation image.

The radiation image storage panel 11 continuously advances in the direction indicated by the allow by means of the nip rolls 12a, 12b. Accordingly, the area of the storage panel which is subjected to the stimulating step (i.e., reading step) is then subjected to an erasing step which uses an erasing lamp 20 such as a sodium lamp. In the erasing step, the radiation energy which still remains in the storage panel after being subjected to the reading step is almost completely released from the storage panel. Therefore, the radiation image storage panel having been subjected to the erasing step contains almost no latent image composed of the remaining radiation energy, and is favorable employable in the next cycle of the radiation image recording and reproducing method.

According to studies of the present inventor on the radiation image reading system illustrated in FIG. 1 which comprises the successive stimulating and erasing steps applied in parallel on the same storage panel, it has been noted that the radiation image in that system sometimes suffers from noises. Therefore, the inventor has further studied the reason of noises observed in the reproduced radiation image, and discovered that the noises are produced by a portion of the erasing light which is applied on the adjacent area of the storage panel and then moves in a zig-zag mode in the horizontal direction within the transparent support of the storage panel along its plane to reach the area which is under stimulation.

Therefore, the troublesome noises can be removed by not performing the reading step and the erasing step on the storage panel in parallel. However, the procedure of the combined reading and erasing step in parallel are very advantageous from the viewpoint of performing the radiation image recording and reproducing method quickly and efficiently. Such system is also advantageous because the whole apparatus can be constructed in a relatively small size.

SUMMARY OF THE INVENTION

Accordingly, it is an object of the present invention to provide a radiation image reading system employing the combined reading and erasing steps but being free from reproducing the noisy radiation image.

The present invention resides in the use of a radiation image storage panel comprising a stimulable phosphor layer and an erasing light-diffusion preventive layer capable of allowing transmission of stimulated emission while preventing an erasing light impinged thereupon from diffusing within the preventive layer along the plane thereof in the radiation image reading system employing the double-side reading system which comprises the steps of:

exciting an area of the phosphor layer of the radiation image storage panel which has a radiation energy therein in the form of a latent image with stimulating rays to release the radiation energy from the phosphor layer as stimulated emission and simultaneously detecting photoelectrically the stimulated emission from both sides of the storage panel to obtain electric signals for reproduction of a radiation image; and applying an erasing light on the same area of the radiation image storage panel after completion of the above exciting and detecting step in parallel with a successive exciting and detecting step applied simultaneously on other area of the storage panel.

The erasing light-diffusion preventive layer of the radiation image storage panel of the invention preferably is in the form of the following layer:

a colored layer capable of absorbing the erasing light;

a layer diffuses the erasing light on the interface between said preventive layer and the stimulable phosphor layer, or an optical path-limiting layer capable of accepting only a light impinged thereupon at an incident angle of 30° or more and guiding the accepted light to pass therethrough vertically.

These erasing light-diffusion preventive layers of the radiation image storage panels according to the invention are effective to prevent troublesome transmission of the erasing light within the storage panel to reach the area under stimulation.

DETAILED DESCRIPTION OF THE INVENTION

The representative structures of the radiation image storage panels according to the invention are described below by referring to the figures illustrated in the attached drawings.

Figure 1:
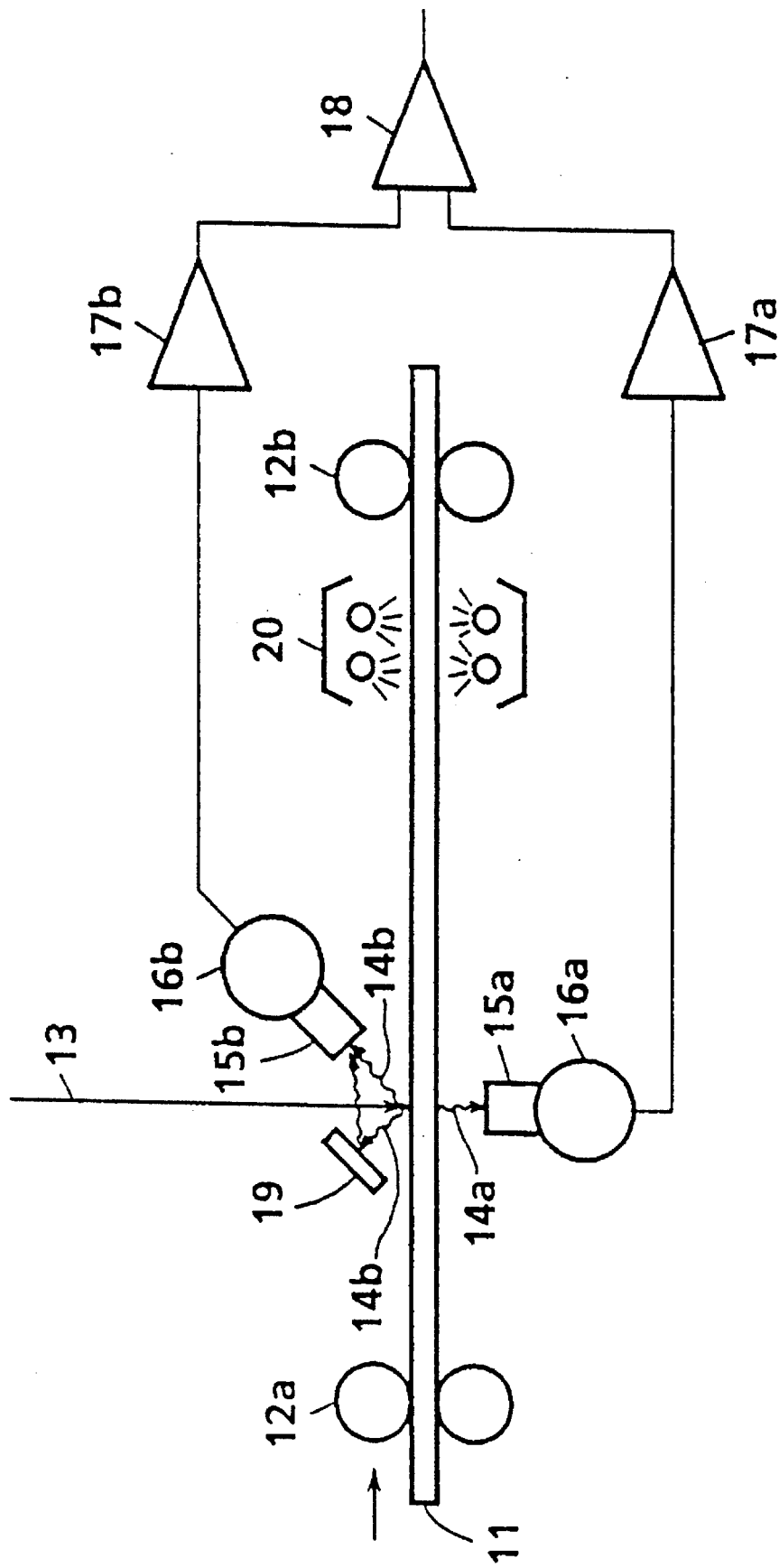
FIG. 1 shows a schematic view of a radiation image reading system which comprises reading from both sides (double-side reading system).
Figure 2:
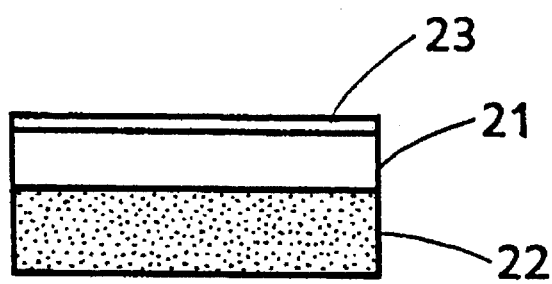
FIG. 2 shows a schematic view of a radiation image storage panel of the invention.

FIG. 2 shows a radiation image storage panel having a stimulable phosphor layer 21 and a colored layer 22 for absorbing an erasing light which is arranged on one surface of the phosphor layer 21. The colored layer 22 is so colored as to become capable of allowing transmission of stimulated emission while preventing an erasing light impinged on it from diffusing within the colored layer along its plane. On the opposite surface of the phosphor layer 21 is arranged a transparent protective layer 23.

Figure 3:
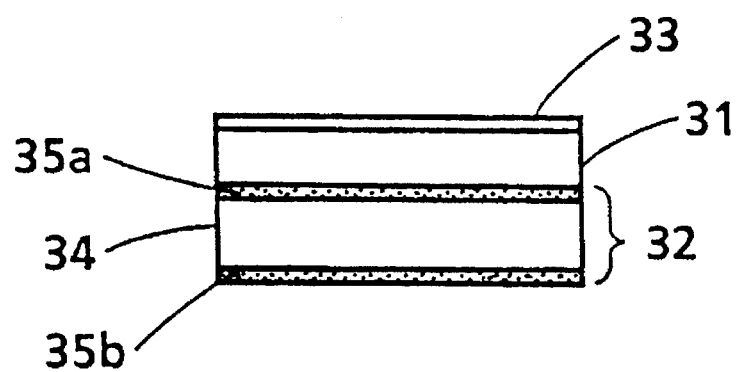
FIGS. 3 through 10 respectively show schematic views of radiation image storage panels which differ from the storage panel of FIG. 2 but are still according to the invention.

FIG. 3 shows a radiation image storage panel having a stimulable phosphor layer 31 and an erasing light-absorbing layer 32 arranged on one surface of the phosphor layer 31. The erasing light-absorbing layer 32 comprises a transparent substrate 34 and colored layers 35a, 35b arranged on each side of the substrate 34. These colored layers are so colored as to become capable of allowing transmission of stimulated emission while preventing an erasing light impinged on it from diffusing within the substrate 34 along its plane. This structure is also effective because the transmission of the erasing light within the attached layer does not advance just in the horizontal direction but advance after successively and repeatedly being reflected on the both surfaces of the attached layer, namely, zig-zagging within the layer. The colored layers 35a, 35b absorb the erasing light and reduce its reflection on their surfaces. On the opposite surface of the phosphor layer 31 is arranged a transparent protective layer 33.

Figure 4:
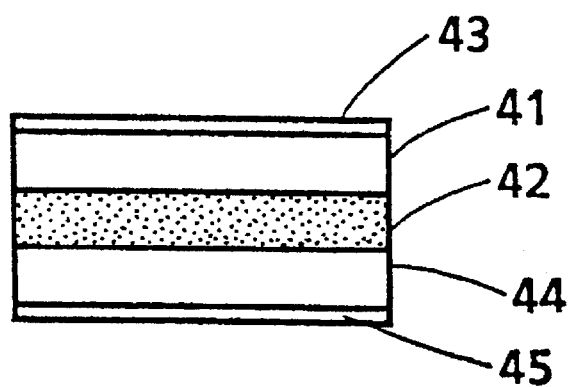

FIG. 4 shows a radiation image storage panel having a stimulable phosphor layer 41 and an erasing light-absorbing layer 42 (which is the same as that in FIG. 2) arranged on one surface of the phosphor layer 41. On the opposite surface of the phosphor layer 41 is arranged a transparent protective layer 43. In this structure, another phosphor layer 44 and another transparent protective layer 45 are further provided on another surface of the erasing light-absorbing layer 42.

The erasing light-absorbing layers shown in FIGS. 2 to 4 further serve as supports of the phosphor layers. Each erasing light-absorbing layer absorbs the erasing light to effectively prevent the transmission of the erasing light in the horizontal direction. Therefore, no troublesome noises are detected on the area under stimulation for reading.

Figure 5:
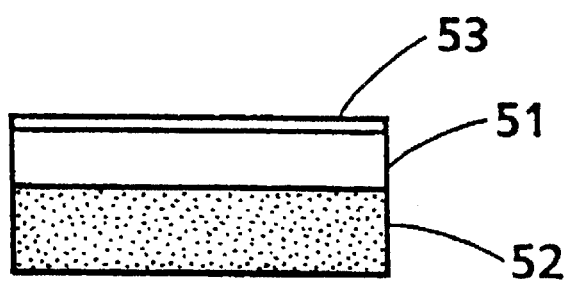

FIG. 5 shows a radiation image storage panel having a stimulable phosphor layer 51 and a layer 52 capable of diffusing the erasing light on the interface between the layer 52 and the stimulable phosphor layer 51. On the opposite surface of the phosphor layer 51 is arranged a transparent protective layer 53.

Figure 6:
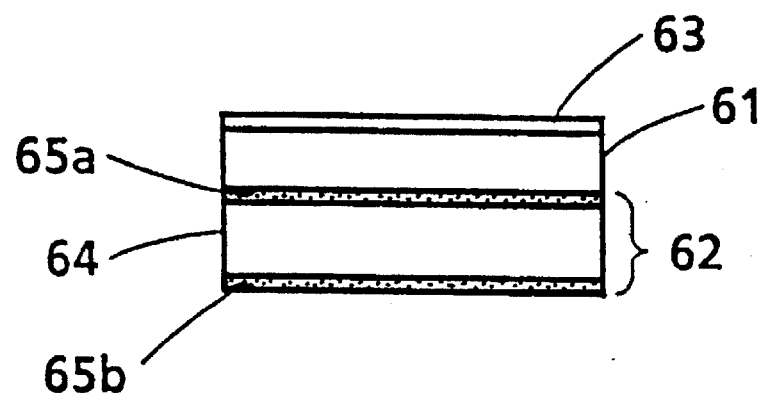

FIG. 6 shows a radiation image storage panel having a stimulable phosphor layer 61 and a layer 62 capable of diffusing the erasing light on the interface between the layer 62 and the stimulable phosphor layer 61. The diffusing layer 62 comprises a transparent substrate 64 and white filler-containing layers 65a, 65b arranged on each side of the substrate 64.

The structures of FIGS. 5 and 6 are also effective for preventing the transmission of the erasing light in the horizontal direction because they diffuse the erasing light in the layer or on the interface between the layer and the phosphor layer. Therefore, no troublesome noises are detected on the area under stimulation for reading.

Figure 7:
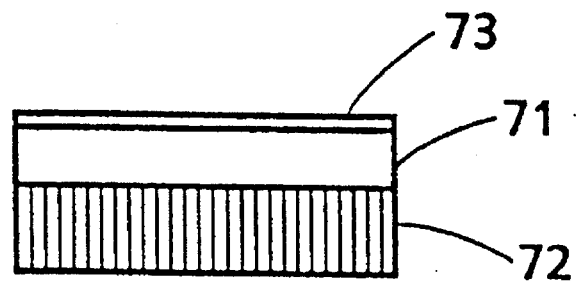

FIG. 7 shows a radiation image storage panel having a stimulable phosphor layer 71 and an optical path-limiting layer 72 capable of accepting only a light impinged thereupon at an incident angle of 30° or more and guiding the accepted light to pass therethrough vertically, which is in the form of a louver. On the opposite surface of the phosphor layer 71 is arranged a transparent protective layer 73.

Figure 8:
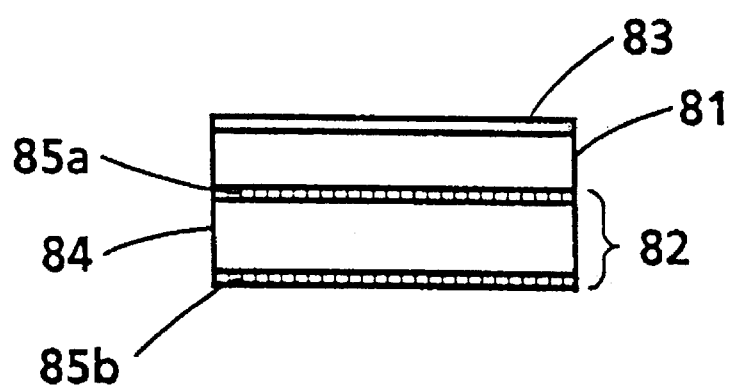

FIG. 8 shows a radiation image storage panel having a stimulable phosphor layer 81 and an optical path-limiting layer 82 capable of accepting only a light impinged thereupon at an incident angle of 30° or more and guiding the accepted light to pass therethrough vertically, which is composed of a transparent substrate 84 and a pair of louver boards 85a, 85b arranged on each side of the substrate 84. On the opposite surface of the phosphor layer 81 is arranged a transparent protective layer 83.

Figure 9:
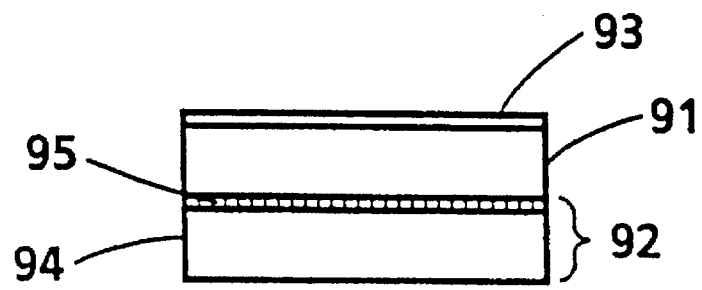

FIG. 9 shows a radiation image storage panel having a stimulable phosphor layer 91 and an optical path-limiting layer 92 capable of accepting only a light impinged thereupon at an incident angle of 30° or more and guiding the accepted light to pass therethrough vertically, which is composed of a transparent substrate 94 and a louver bard 95 arranged on the surface of the substrate 94 in contact to the phosphor layer 91. On the opposite surface of the phosphor layer 91 is arranged a transparent protective layer 93.

The structures of FIGS. 6 to 9 are effective for preventing the transmission of the erasing light in the horizontal direction because these define the transmission of the erasing light only in the vertical direction. Therefore, no troublesome noises are detected on the area under stimulation for reading.

The radiation image storage panel of the invention may have a support which serves as the erasing light-absorbing layer and further as the erasing light diffusing layer. An example of such structure is illustrated in FIG. 10.

Figure 10:
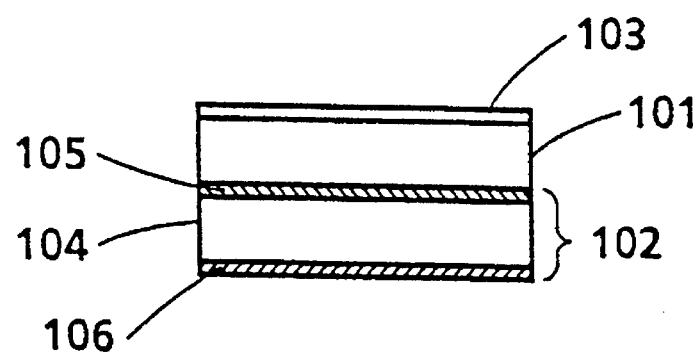

The radiation image storage panel of FIG. 10 comprises a stimulable phosphor layer 101 and a layer 102 capable of absorbing and diffusing the erasing light on one side. On another side is provided a transparent protective layer 103. The layer 102 comprises a transparent substrate 104, an erasing light-diffusing layer 105, and a colored layer 106 for absorbing the erasing light.

Thus, the radiation image storage panel of the invention may have one or more of the colored layer for absorbing the erasing light, the erasing light-diffusing layer, and the optical path-limiting layer in any combination.

Details of the radiation image storage panel of the invention and the process for its preparation are described below.

The radiation image storage panel of the invention comprises a stimulable phosphor layer and an erasing light-diffusion preventive layer which may also serve as a support. The stimulable phosphor layer comprising a stimulable phosphor can be generally prepared in the form of an independent stimulable phosphor sheet by coating a coating dispersion of the stimulable phosphor in a binder solution on a temporary support such as a glass plate or a plastic sheet, drying, and peeling the dry coated layer off the temporary support.

The stimulable phosphor gives a stimulated emission when it is irradiated with stimulating rays after it is exposed to radiation. In the preferred radiation image storage panel, a stimulable phosphor giving a stimulated emission of a wavelength in the range of 300 to 500 nm when it is irradiated with stimulating rays of a wavelength in the range of 400 to 900 nm is employed. Examples of the preferred stimulable phosphors include divalent europium activated alkaline earth metal halide phosphors and a cerium activated alkaline earth metal halide phosphors. Both stimulable phosphors favorably give the stimulated emission of high luminance. However, the stimulable phosphors employable in the radiation image storage panel of the invention are not limited to the above-mentioned preferred stimulable phosphors.

The stimulable phosphor sheet also can be prepared using no binder polymer. For instance, the stimulable phosphor sheet can be formed of aggregated phosphor particles which may be impregnated with a polymer. Otherwise, the stimulable phosphor layer can be formed on a support by vacuum deposition.

The stimulable phosphor sheet or layer is then combined with the erasing light-diffusion preventive sheet or layer, for instance, using an adhesive.

Otherwise, the stimulable phosphor layer can be directly formed on the erasing light-diffusion preventive sheet, or the erasing light-diffusion preventive layer can be directly formed on the stimulable phosphor layer. On the surface of the phosphor layer opposite to the surface to face the erasing light-diffusion preventive layer may be provided a transparent protective layer (which may be in the form of an independent film).

Representative examples of the erasing light-diffusion preventive layer include a colored layer capable of absorbing the erasing light, a layer diffuses the erasing light on its interface with the stimulable phosphor layer, and an optical path-limiting layer capable of accepting only a light impinged thereupon at an incident angle of 30° or more and guiding the accepted light to pass therethrough vertically.

The colored layer can be a wholly colored plastic sheet or a transparent plastic sheet having a colored layer on one or both surfaces. The coloring material employable for the preparation of the colored layer can be an organic or inorganic colorant which has a body color ranging from blue to green.

Examples of the organic colorants having a body color ranging from blue to green include Zapon Fast Blue 3G (available from Hoechst AG), Estrol Brill Blue N-3RL (available from Sumitomo Chemical Co., Ltd.), D & C Blue No. 1 (available from National Aniline AG), Sprit Blue (available from Hodogaya Chemical Co., Ltd.), Oil Blue No. 603 (available from Orient Co., Ltd.), Kiton Blue A (available from Ciba-Geigy), Aizen Cathilon Blue GLH (available from Hodogaya Chemical Co., Ltd.), Lake Blue A, F, H (available from Kyowa Chemical Co., Ltd.), Rodarin Blue 6GX (available from Hodogaya Chemical Co., Ltd.), Primocyanine 6GX (available from Inahata Sangyo Co., Ltd.), Brillacid Green 6BH (available from Hodogaya Chemical Co., Ltd.), Cyanine Blue BNRS (available from Toyo Ink Mfg. Co., Ltd.), and Lionol Blue SL (available from Toyo Ink Mfg. Co., Ltd.). Examples of the inorganic colorants having a body color ranging from blue to green include ultramarine (i.e., ultramarine blue), cobalt blue, cerulean blue, chromium oxide, and $TiO_2$-ZnO-CoO-NiO.

The erasing light-diffusing layer can be a plastic sheet containing a white filler therein or a transparent plastic sheet having a white filler-containing resin layer on one or both surfaces. Examples of the white fillers include silicon powder, polymer beads, titanium dioxide, silicon dioxide (silica), barium sulfate, clay, and kaolin. Also employable is a ZnO powder which has a light-diffusing property as well as an antistatic property.

The optical path-limiting layer can be prepared in the form of a light-shielding support having a honeycomb structure such as a support in the form of louver as illustrated in FIG. 7 or a support having a light-shielding screen of a honeycomb structure as illustrated in FIGS. 8 and 9.

The radiation image storage panel is generally employed repeatedly in cycle. Accordingly, the stimulable phosphor layer preferably has a transparent protective layer of a thickness of less than 30 μm on its surface other than the surface facing the support or the light diffusing-preventive layer. The protective layer can be made of cellulose acetate, nitrocellulose, polymethyl methacrylate, polyvinyl butyral, polyvinyl formal, polycarbonate, polyvinyl acetate, vinyl chloride-vinyl acetate copolymer, or fluororesin. The protective layer is preferably made of a fluororesin (namely, a fluorine atom-containing resin). Also employable for the preparation of the protective layer is polyethylene terephthalate, polyethylene naphthalate, polyimide, polyethylene, vinylidene chloride, or polyamide. The protective layer can be prepared directly on the phosphor layer using a coating solution. Also employable is a beforehand prepared transparent plastic film.

Examples embodying the present invention are given below.

EXAMPLE 1

To methyl ethyl ketone were added 200 g of divalent europium activated barium fluorobromide (BaFBr:$Eu^{2+}$) stimulable phosphor particles, 40 g of a solution of a polyurethane resin (Pandex T-5265M, product of Dai-Nippon Ink Chemical Industries, Co., Ltd.) in methyl ethyl ketone (20 weight %), and 2 g of Bisphenol A type epoxy resin. The resulting mixture was stirred by a propeller mixer to give a dispersion containing the binder and phosphor particles in the ratio of 1:20 (weight ratio).

The obtained dispersion was evenly coated over a polyethylene terephthalate sheet (temporary support having a releasing layer, thickness: 250 μm) fixed on a glass plate with an adhesive. The coated sheet together with the glass plate was placed in an oven and heated gradually from 25° C. to 100° C. to dry the coated layer. Thus, a stimulable phosphor layer having a thickness of 300 μm was formed on the temporary support. The phosphor layer was then separated from the support to give a stimulable phosphor sheet.

Separately, 0.3 g of a ultramarine blue (mean particle diameter: 0.8 μm) and 50 g of a solution of a soft acrylic resin (20% methyl ethyl ketone solution) was added to 100 g of methyl ethyl ketone to prepare a coating solution. The coating solution was then coated on one surface of a transparent acrylic resin plate (thickness: 1 mm) with a doctor blade and dried to form a blue colored layer (inner colored layer) of 10 μm thick. On another surface of the acrylic resin plate was coated using a doctor blade a solution prepared by mixing 0.3 g of a ultramarine blue (mean particle diameter: 0.8 μm), 30 g of a fluororesin solution (40% solution of fluoro-olefin-vinyl ether copolymer), 5 g of an isocyanate-type cross-linking agent solution (70% solution) and 100 g of methyl ethyl ketone. The coated layer was dried to form a blue colored outer layer of 10 μm thick.

On the inner colored layer of the above-obtained acrylic resin plate was fixed the stimulable phosphor layer using an adhesive. On the fixed phosphor layer was then fixed a transparent polyethylene terephthalate film (thickness: 11 μm) using an adhesive. There was obtained a radiation image storage panel of the invention having the structure of FIG. 3.

EXAMPLE 2

To 100 g of methyl ethyl ketone were added 0.3 g of a silicon powder (mean particle diameter: 1 μm) and 50 g of a solution of a soft acrylic resin (20% methyl ethyl ketone solution) to prepare a coating solution. The coating solution was then coated on one surface of a transparent acrylic resin plate (thickness: 1 mm) with a doctor blade and dried to form a white filler-containing layer (inner diffusion layer) of 10 μm thick. On another surface of the acrylic resin plate was coated using a doctor blade a solution prepared by mixing 0.3 g of a ultramarine blue (mean particle diameter: 0.8 μm), 30 g of a fluororesin solution (40% solution of fluoroolefinvinyl ether copolymer), 5 g of an isocyanate-type cross-linking agent solution (70% solution) and 100 g of methyl ethyl ketone. The coated layer was dried to form a blue colored outer layer of 10 μm thick.

On the inner diffusion layer of the above-obtained acrylic resin plate was fixed the stimulable phosphor layer of Example 1 using an adhesive. On the fixed phosphor layer was then fixed a transparent polyethylene terephthalate film (thickness: 11 μm) using an adhesive. There was obtained a radiation image storage panel of the invention having the structure of FIG. 10.

EXAMPLE 3

On one surface of a blue-colored acrylic resin plate (thickness: 1 mm, transmittance at 600 nm: 50%) was coated using a doctor blade a solution prepared by mixing 50 g of a soft acrylic resin (20% methyl ethyl ketone solution) and 100 g of methyl ethyl ketone. The coated layer was dried to form an adhesive layer of 10 μm thick.

On the adhesive layer of the acrylic resin plate was fixed the stimulable phosphor layer of Example 1 using an adhesive. On the fixed phosphor layer was then fixed a transparent polyethylene terephthalate film (thickness: 11 μm) using an adhesive. There was obtained a radiation image storage panel of the invention having the structure of FIG. 2.

EXAMPLE 4

On one surface of a opaque, semitransparent acrylic resin plate (thickness: 1 mm, transmittance at 600 nm: 87%, haze: 85) was coated using a doctor blade a solution prepared by mixing 50 g of a soft acrylic resin (20% methyl ethyl ketone solution) and 100 g of methyl ethyl ketone. The coated layer was dried to form an adhesive layer of 10 µm thick.

On the adhesive layer of the acrylic resin plate was fixed the stimulable phosphor layer of Example 1 using an adhesive. On the fixed phosphor layer was then fixed a transparent polyethylene terephthalate film (thickness: 11 µm) using an adhesive. There was obtained a radiation image storage panel of the invention having the structure of FIG. 5.

EXAMPLE 5

On one surface of a transparent acrylic resin plate (thickness: 1 mm) was fixed a light-shielding screen (honeycomb-block type light-shielding screen, thickness: 0.25 ram, product of Asahi Chemical Industries Co., Ltd.) using an adhesive. Then, on the screen was coated using a doctor blade a solution prepared by mixing 50 g of a soft acrylic resin (20% methyl ethyl ketone solution) and 100 g of methyl ethyl ketone. The coated layer was dried to form an adhesive layer of 10 µm thick.

On the adhesive layer formed on the light-shielding screen layer of the acrylic resin plate was fixed the stimulable phosphor layer of Example 1 using an adhesive. On the fixed phosphor layer was then fixed a transparent polyethylene terephthalate film (thickness: 11 µm) using an adhesive. There was obtained a radiation image storage panel of the invention having the structure of FIG. 9.

COMPARISON EXAMPLE 1

On one surface of a transparent acrylic resin plate (thickness: 1 mm) was coated using a doctor blade a solution prepared by mixing 50 g of a soft acrylic resin (20% methyl ethyl ketone solution) and 100 g of methyl ethyl ketone. The coated layer was dried to form an adhesive layer of 10 µm thick.

On the adhesive layer of the acrylic resin plate was fixed the stimulable phosphor layer of Example 1 using an adhesive. On the fixed phosphor layer was then fixed a transparent polyethylene terephthalate film (thickness: 11 µm) using an adhesive. There was obtained a radiation image storage panel for comparison.

[Evaluation on Transmission of Erasing Light in Radiation Image Storage Panel on Plane Direction]

Figure 11:
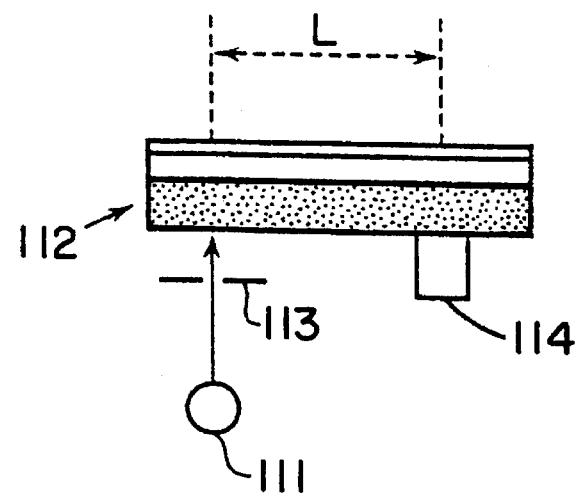
FIG. 11 shows a schematic view of an apparatus employed for evaluating the radiation image storage panels of Examples and Comparison Examples with respect to transmission of the erasing light within the storage panels along their planes.

An erasing light radiated from a sodium lamp was irradiated on a support or an erasing light-diffusion preventive layer at an area adjacent to one end of a radiation image storage panel, in the manner as illustrated in FIG. 11. The erasing light transmitted through the support or preventive layer was detected at the position of L mm distance away on the same plane, using a photodiode (effective diameter: 8 mm). The results are indicated by the ratio of an intensity of the detected erasing light transmitted to an intensity of the applied erasing light, which is as follows:

[Intensity of the erasing light detected by photodiode: mW]/[Intensity of the applied erasing light: mW]

Also measured were transmittance (at 400 nm) of the support or the erasing light-diffusion preventive layer with respect to the stimulated emission.

The obtained value are set forth in Table 1.

TABLE 1

|  | L = 30 mm | L = 50 mm | L = 100 mm | Transmittance |
|---|---|---|---|---|
| Example 1 | −5.4 | −6.1 | −6.9 | 88% |
| Example 2 | −4.0 | −5.2 | −6.3 | 87% |
| Example 3 | −6.0 | −6.6 | −7.3 | 85% |
| Example 4 | −4.2 | −5.3 | −6.5 | 87% |
| Example 5 | −4.6 | −5.7 | −6.6 | 85% |
| Com. Ex. 1 | −3.8 | −4.9 | −6.0 | 90% |

I claim:

1. A radiation image storage panel comprising a stimulable phosphor layer and an erasing light-diffusion preventive layer capable of allowing transmission of stimulated emission while preventing an erasing light impinged thereupon from diffusing within the preventive layer along the plane thereof.

2. The radiation image storage panel of claim 1, wherein the erasing light-diffusion preventive layer is a colored layer capable of absorbing the erasing light.

3. The radiation image storage panel of claim 1, wherein the erasing light-diffusion preventive layer diffuses the erasing light on the interface between said preventive layer and the stimulable phosphor layer.

4. The radiation image storage panel of claim 1, wherein the erasing light-diffusion preventive layer is an optical path-limiting layer capable of accepting only a light impinged thereupon at an incident angle of 30° or more and guiding the accepted light to pass therethrough vertically.

5. A radiation image reading method comprising the steps of:

exciting an area of the phosphor layer of a radiation image storage panel which has a radiation energy therein in the form of a latent image with stimulating rays to release the radiation energy from the phosphor layer as stimulated emission and simultaneously detecting photoelectrically the stimulated emission from both sides of the storage panel to obtain electric signals for reproducing a radiation image, said radiation image storage panel comprising a stimulable phosphor layer and an erasing light-diffusion preventive layer capable of allowing transmission of stimulated emission while preventing an erasing light impinged thereupon from diffusing within the preventive layer along the plane thereof;

and applying an erasing light on the same area of the radiation image storage panel after completion of the above exciting and detecting step in parallel with a successive exciting and detecting step applied simultaneously on other area of the storage panel.

6. The radiation image reading method of claim 5, wherein the erasing light-diffusion preventive layer of the radiation image storage panel is a colored layer capable of absorbing the erasing light.

7. The radiation image reading method of claim 5, wherein the erasing light-diffusion preventive layer of the radiation image storage panel diffuses the erasing light on the interface between said preventive layer and the stimulable phosphor layer.

8. The radiation image reading method of claim 5, wherein the erasing light-diffusion preventive layer of the radiation image storage panel is an optical path-limiting layer capable of accepting only a light impinged thereupon at an incident angle of 30° or more and guiding the accepted light to pass therethrough vertically.

* * * * *